United States Patent
Lin et al.

(10) Patent No.: US 10,774,257 B2
(45) Date of Patent: Sep. 15, 2020

(54) RANDOM COPOLYMER AND PREPARATION METHOD THEREOF, AND DRILLING FLUID

(71) Applicants: China Petroleum & Chemical Corporation, Beijing (CN); SINOPEC Research Institute of Petroleum Engineering, Beijing (CN)

(72) Inventors: Yongxue Lin, Beijing (CN); Xiaohua Yang, Beijing (CN); Lin Wang, Beijing (CN); Jian He, Beijing (CN); Junbin Jin, Beijing (CN); Fan Yang, Beijing (CN); Haibo Wang, Beijing (CN)

(73) Assignees: CHINA PETROLEUM & CHEMICAL CORPORATION, Beijing (CN); SINOPEC RESEARCH INSTITUTE OF PETROLEUM ENGINEERING, Bejing (CN)

( * ) Notice: Subject to any disclaimer, the term of this patent is extended or adjusted under 35 U.S.C. 154(b) by 19 days.

(21) Appl. No.: 16/129,177

(22) Filed: Sep. 12, 2018

(65) Prior Publication Data
US 2019/0092997 A1 Mar. 28, 2019

(30) Foreign Application Priority Data
Sep. 25, 2017 (CN) .......................... 2017 1 0875461

(51) Int. Cl.
C09K 8/24 (2006.01)
C08F 293/00 (2006.01)
C08F 220/56 (2006.01)

(52) U.S. Cl.
CPC .............. *C09K 8/24* (2013.01); *C08F 220/56* (2013.01); *C08F 293/005* (2013.01); *C08F 2438/00* (2013.01)

(58) Field of Classification Search
None
See application file for complete search history.

(56) References Cited

U.S. PATENT DOCUMENTS 6,465,397 B1 * 10/2002 Patterson .............. C08F 220/56
507/222
2007/0039732 A1 * 2/2007 Dawson .................. C09K 8/588
166/270
(Continued)

FOREIGN PATENT DOCUMENTS

CN 101691485 A 4/2010
CN 103130953 A 6/2013
(Continued)

OTHER PUBLICATIONS

Wang Zhonghua, "Synthesis and Properties of AMPS/AM/AN Terpolymer as Filtrate Loss Controller for Drilling Fluids", Oilfield Chemistry, 1995, 12(4)367-369.
(Continued)

*Primary Examiner* — John J Figueroa
(74) *Attorney, Agent, or Firm* — Novick, Kim & Lee, PLLC; Allen Xue

(57) ABSTRACT

A random copolymer, a preparation method of the random copolymer, a drilling fluid containing the random copolymer. The random copolymer contains structural unit (A) represented by formula (1), structural unit (B) represented by formula (2), structural unit (C) represented by formula (3), and structural unit (D) represented by formula (4) or (5):

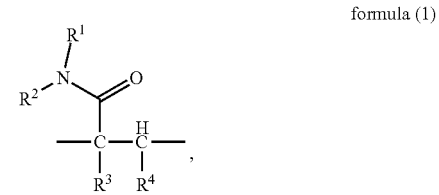

formula (1)

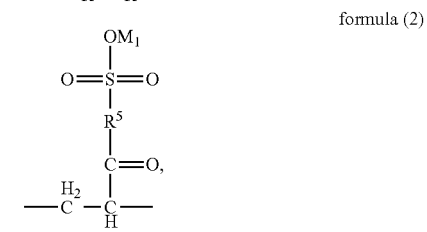

formula (2)

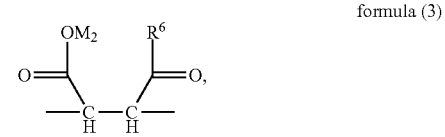

formula (3)

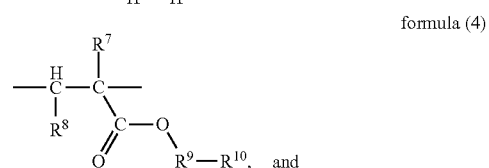

formula (4)

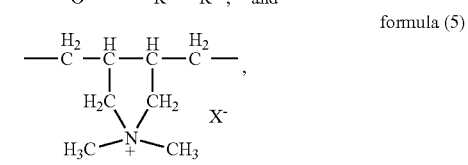

formula (5)

wherein X is halogen. When the random copolymer is used as a filter loss reducer in a high-calcium drilling fluid, the filter loss of the high-calcium drilling fluid can be reduced.

16 Claims, No Drawings

(56) References Cited

U.S. PATENT DOCUMENTS

2013/0037267 A1* 2/2013 Regnault de la Mothe ................
C08F 220/56
166/293
2013/0075096 A1* 3/2013 Khalfallah .............. C04B 28/02
166/294

FOREIGN PATENT DOCUMENTS

| CN | 104292387 A | 1/2015 |
| CN | 104403645 A | 3/2015 |
| CN | 104497995 A | 4/2015 |
| CN | 107286209 A | 10/2017 |

OTHER PUBLICATIONS

Wang Zhonghua, "Synthesis and Evaluation of P(AMPS-IPAM-AM) as a Filtration Reducer", Drilling Fluid and Completion Fluid, 2010, 27(2): 10-13.
Wang Zhonghua, "Synthesis of P(AMPS-DEAM) Polymer Used as Loss Additive for Anti-calcium Drilling Fluid", Fine and Specialty Chemicals, 2010, 18(4):24-28.
Jiang Guancheng et al., "Synthesis and Evaluation of High Temperature Resistant and High Calcium Tolerant Filtrate Loss Additive DF-1", Oilfield Chemistry, 2015, 32(1):1-6.

* cited by examiner

RANDOM COPOLYMER AND PREPARATION METHOD THEREOF, AND DRILLING FLUID

CROSS REFERENCE TO RELATED APPLICATIONS

The present application claims the benefit of the Chinese Patent Application No. 201710875461.7 filed on Sep. 25, 2017, the entirety of which is incorporated herein by reference.

FIELD OF THE INVENTION

The present invention relates to the field of filter loss reduction for drilling fluids under high calcium content and high temperature conditions, in particular to a random copolymer, a preparation method of the random copolymer, and a drilling fluid containing the random copolymer as a calcium-tolerant and temperature-tolerant filter loss reducer.

BACKGROUND OF THE INVENTION

As the oil and natural gas exploration further developed, high calcium salt content formations with high-temperature or high pressure are encountered more and more frequently in drilling, and it is more difficult to maintain the filtration and rheological properties of the drilling fluid in the drilling process. Consequently, troublesome situations, such as wellbore instability, barite settlement, and jamming of drilling tool, etc., may occur easily. In a high temperature and high calcium salt environment, the additives used to maintain the properties of drilling fluid may have chemical and physical changes such as degradation, crosslinking, desorption, dehydration, and flocculation, etc., which may result in out-of-control of the filtration and rheological properties of the drilling fluid, slow down the drilling speed and increase the operation risks severely. For example, in the Ta-he Oil Field in Xinjiang, high calcium salt and high-pressure high-calcium brine strata are widely distributed and large sections of salt gypsum strata and high-calcium brine contamination are existed in Tazhong, Bamai, Yubei, and peripheral exploration areas. Specifically, for example, in Mabei Well #1, Cambrian high-calcium brine, which has calcium ion content as high as 26,000 mg/L and chloride ion content as high as 179,000 mg/L, was encountered in the drilling process, severe overflow happened, the drilling fluid returned from the bottom of the well flocculated and cured, with poor rheology, and the medium-pressure filter loss was up to 70-80 mL. Since the high-calcium brine infiltrated continuously, it was hardly to maintain and handle the performance of drilling fluid, leading to the abandon of wells. A temperature-tolerant and calcium-tolerant filter loss reducer technology has become a bottle neck in the development of drilling fluids for deep wells and extra-deep wells in the peripheral exploration areas in Xinjiang.

Filter loss reducer is one of the core additives for drilling fluid, and its main function is to promote the drilling fluid to form thin and dense filter cakes with low permeability on the well wall, and thereby reduce filtrate invasion into the strata, decrease the incidence of mud shale hydrated swelling to realize well wall stability. In a case that free high-valence ions (e.g., $Ca^{2+}$ and $Mg^{2+}$, etc.) exist, most existing filter loss reducers, including natural modified filter loss reducers and synthesized filter loss reducers, have irreversible strong interactions with the ions, and such interactions are even stronger at high temperatures, resulting in group changes and conformation damages of the molecules of the additives, and even resulting in main-chain breakage and severely compromised effect.

In recent years, a great number of researches have been made on temperature resistance and salinity resistance of filter loss reducers in China and foreign countries. In those researches, 2-acrylamido-2-methylpropane sulfonic acid (AMPS) monomer is mainly used to modify the chain structure of polymeric filter loss reducer, the temperature-tolerant and calcium-tolerant of the product are improved by inducing the two methyl groups of side functional groups and the sulfonic groups of AMPS.

The documents "Synthesis and Performance of AMPS/AM/AN Terpolymer As Filtrate Loss Controller For Drilling Fluids" (Zhonghua Wang, Oil Field Chemistry, 1995, 12(4): 367-369), "Synthesis and Evaluation of P(AMPS-IPAM-AM) as a Filtration Reducer" (Zhonghua Wang, Drilling Fluids and Completion Fluids, 2010, 27(2): 10-13) and "Synthesis of P(AMPS-DEAM) Polymer Used as Loss Additive for Anti-calcium Drilling Fluid" (Zhonghua Wang, Fine and Special Chemicals, 2010, 18(4):24-28) disclose an AMPS/AM/AN terpolymer, an AMPS/IPAM/AM terpolymer, and an AMPS/DEAM bipolymer respectively, all of which exhibit good temperature-tolerant and filter loss reducing performance in calcium-containing drilling fluids.

CN201410777862.5 discloses a salinity-tolerant and calcium-tolerant AMPS-AA-AM-DMDAAC copolymerized filter loss reducer for drilling fluid and a preparation method thereof. Owing to the greatly increased molecular weight, the filter loss reducer achieves significant improvement in encapsulation capability, inhibition capability, thermostability, and resistance to salt and calcium contamination, etc.

"Synthesis and Evaluation of High Temperature Resistant and High Calcium Tolerant Filtrate Loss Additive DF-1" (Guancheng Jiang, et al., Oil Field Chemistry, 2015, 32(1): 1-6) discloses a drilling fluid filter loss reducer P(AM-AMPS-AA-DMDAAC)/nano-$SiO_2$ synthesized by introducing nano-$SiO_2$, which has high temperature-tolerant, salinity-tolerant, and calcium-tolerant properties.

However, existing filter loss reducers produced domestically can effectively control the filter loss only if the temperature is lower than 150° C. and the $Ca^{2+}$ content is lower than $1.4 \times 10^4$ mg/L. There is no domestic filter loss reducer that has higher temperature-tolerant capability under the condition of higher calcium ion contents; moreover, a lack of control on molecular weight, normally over high, leads to a static structural force of drilling fluid, which has no benefit to rheology control of n high-temperature and high-density drilling fluid.

Hence, there is an urgent need for a calcium-tolerant and temperature-tolerant filter loss reducer for drilling fluid.

SUMMARY OF THE INVENTION

To overcome the drawback of unsatisfactory calcium-tolerant and temperature-tolerant properties of the filter loss reducers for drilling fluid in the prior art, the present invention provides a random copolymer, a preparation method of the random copolymer, and a drilling fluid containing the random copolymer. In the random copolymer, the structures and proportions of different functional groups in the molecular chains are adjusted and controlled by introducing innovative calcium-tolerant monomers. When the random copolymer is used as a filter loss reducer in a high-calcium drilling fluid, it can interact with clay particles to improve filter loss reduction efficacy, and form flexible, thin and dense filter cakes that have low permeability, and thereby effectively reduce filter loss of the drilling fluid and improve temperature tolerant of the additives.

To attain the object described above, in a first aspect, the present invention provides a random copolymer, which contains structural unit (A) represented by formula (1), structural unit (B) represented by formula (2), structural unit (C) represented by formula (3), and structural unit (D) represented by formula (4) or (5),

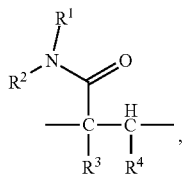

formula (1)

wherein, $R^1$ and $R^2$ are H or $C_1$-$C_6$ alkyl respectively and independently, and $R^3$ and $R^4$ are H or $C_1$-$C_3$ alkyl respectively and independently;

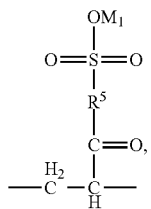

formula (2)

wherein, $R^5$ is —O—R— or —NH—R—; wherein, R is —$C_mH_{2m}$—, m=4, 5 or 6; and $M_1$ is H, $NH_4$, Na or K;

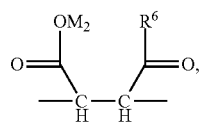

formula (3)

wherein, $R^6$ is selected from

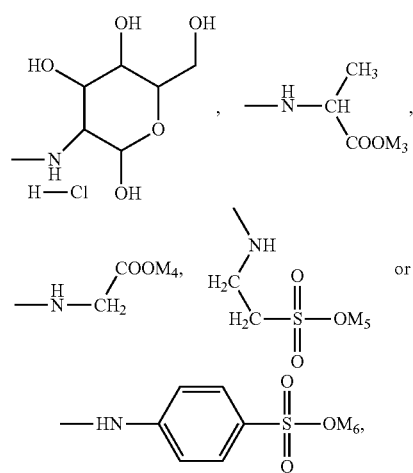

and $M_2$-$M_6$ are H, $NH_4$, Na or K respectively and independently;

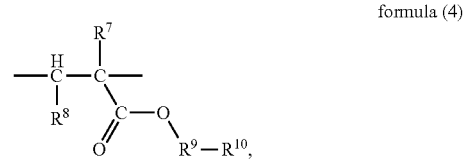

formula (4)

wherein, $R^7$ and $R^8$ are H or $C_1$-$C_6$ alkyl respectively and independently, $R^9$ is —$C_nH_{2n}$—, n is an integer within a range of 2-6, and $R^{10}$ is

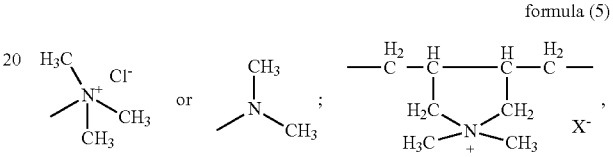

formula (5)

wherein, X is halogen.

Preferably, the apparent viscosity of water solution of the random copolymer at 1 wt % concentration is 10-40 mPa·s.

Preferably, based on the total weight of the random copolymer, the random copolymer contains 30-50 wt % structural unit (A), 40-60 wt % structural unit (B), 2-10 wt % structural unit (C), and 1-10 wt % structural unit (D).

Preferably, in the formula (1), $R^1$-$R^4$ is H; in the formula (2), $R^5$ is —O—C(CH$_3$)$_2$—CH$_2$— or —NH—C(CH$_3$)$_2$—CH$_2$—; in the formula (3), $R^6$ is

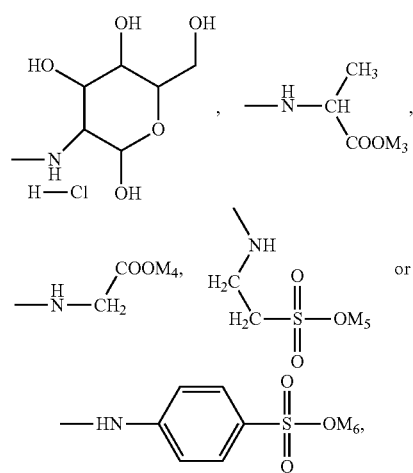

in the formula (4), $R^7$ and $R^8$ are H or methyl respectively and independently, and $R^9$ is —CH$_2$CH$_2$—; in the formula (5), X is Cl.

In a second aspect, the present invention provides a method for preparing a random copolymer, which comprises:

Under nitrogen shielding and in the presence of an initiator, a monomer (a) represented by formula (6), a monomer (b) represented by formula (7), a monomer (c) represented by formula (8), and monomer (d) represented by formula (9) or (10) are controlled to have free radical copolymerization reactions;

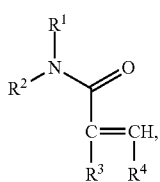

formula (6)

wherein, $R^1$ and $R^2$ are H or $C_1$-$C_6$ alkyl respectively and independently, and $R^3$ and $R^4$ are H or $C_1$-$C_3$ alkyl respectively and independently;

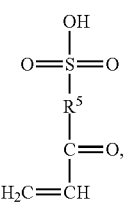

formula (7)

wherein, $R^5$ is —O—R— or —NH—R—, wherein, R is —$C_mH_{2m}$—, m=4, 5 or 6;

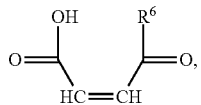

formula (8)

wherein, $R^6$ is selected from

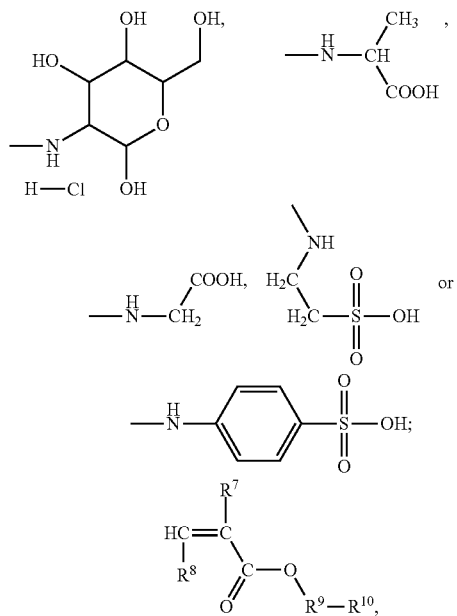

formula (9)

wherein, $R^7$ and $R^8$ are H or $C_1$-$C_6$ alkyl respectively and independently, $R^9$ is —$C_nH_{2n}$—, n is an integer within a range of 2-6, and $R^{10}$ is

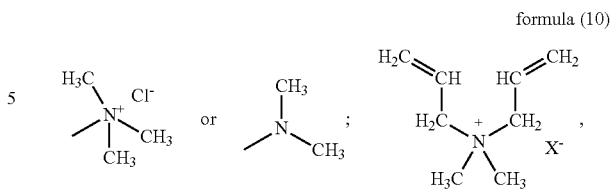

formula (10)

wherein, X is halogen.

Preferably, the monomers are dosed as follows: the monomer (a) is 20-50 pbw, the monomer (b) is 40-70 pbw, the monomer (c) is 1-10 pbw, and the monomer (d) is 0.5-8 pbw.

Preferably, in the formula (6), $R^1$-$R^4$ is H; in the formula (7), $R^5$ is —O—C(CH$_3$)$_2$—CH$_2$— or —NH—C(CH$_3$)$_2$—CH$_2$—; in the formula (8), $R^6$ is

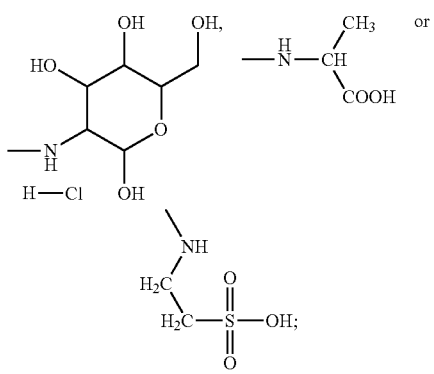

in the formula (9), $R^7$ and $R^8$ are H or methyl respectively and independently, and $R^9$ is —CH$_2$CH$_2$—; in the formula (10), X is Cl.

Preferably, the initiator is selected from oxidation-reduction initiators or azo initiators.

Preferably, the total dose of the initiator is 0.1-1.6 wt % of the total weight of all monomers.

Preferably, the method of controlling the monomer (a), monomer (b), monomer (c) and monomer (d) to have free radical copolymerization reactions comprises:

Adding the monomers into alkaline liquor and dissolving them to a homogeneous state, and then charging nitrogen to remove oxygen, to obtain mixed solution of the monomers; adjusting the temperature of the mixed solution of the monomers to 40° C.-75° C., and adjusting the pH to 5-10; then adding the initiator to initiate the copolymerization reaction and maintaining the copolymerization reaction for 0.2-4 h, to obtain a gelatinous product; pelleting, drying, and pulverizing the gelatinous product.

Preferably, in the mixed solution of the monomers, the total weight concentration of the monomer (a), monomer (b), monomer (c) and monomer (d) is 20-60 wt %.

In a third aspect, the present invention provides a random copolymer prepared with the preparation method disclosed in the present invention.

In a fourth aspect, the present invention provides a use of the random copolymer provided in the present invention in drilling fluids.

Preferably, the random copolymer is added as a filter loss reducer for drilling fluid into the base mud of drilling fluid; with respect to 100 mL base mud of drilling fluid, the dose of the random copolymer is 0.5-4 g.

In a fifth aspect, the present invention provides a drilling fluid, which comprises the random copolymer provided in the present invention as a filter loss reducer and base mud, wherein, with respect to 100 mL base mud, the dose of the random copolymer is 0.5-4 g.

With the technical solutions described above, monomers contained in a target random copolymer are selected, and the target random copolymer that contains structural unit (A), structural unit (B), structural unit (C) and structural unit (D) is obtained through polymerization. When the random copolymer is used as a filter loss reducer in a water-based drilling fluid, the obtained drilling fluid can attain a good protective colloid effect for clay particles under an environmental condition of high-concentration calcium ions, can form flexible, thin and dense filter cakes that have low permeability, and reduce the filter loss of the high-calcium drilling fluid. The random copolymer may be used in high-temperature (150° C.) and high-calcium drilling fluid systems. In the present invention, multiple monomers (a, b, c, d) are polymerized in a synergetic manner in the random copolymer polymerization process, to provide a random copolymer that has the above-mentioned structural unit (A)-(D). Furthermore, the monomer (c) and the monomer (d) can be added to take a combined action, so as to improve the inhibition and collapse prevention performance of the polymer. Thus, the obtained filter loss reducer has appropriate relative molecular mass, and the flow pattern of the drilling fluid at high density can be controlled better.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a random copolymer, which contains structural unit (A) represented by formula (1), structural unit (B) represented by formula (2), structural unit (C) represented by formula (3), and structural unit (D) represented by formula (4) or (5),

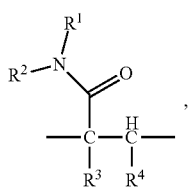

formula (1)

wherein, $R^1$ and $R^2$ are H or $C_1$-$C_6$ alkyl respectively and independently, and $R^3$ and $R^4$ are H or $C_1$-$C_3$ alkyl respectively and independently;

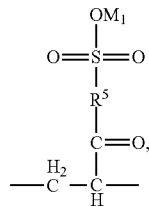

formula (2)

wherein, $R^5$ is —O—R— or —NH—R—, wherein, R is —$C_mH_{2m}$—, m=4, 5 or 6, and $M_1$ is H, $NH_4$, Na or K;

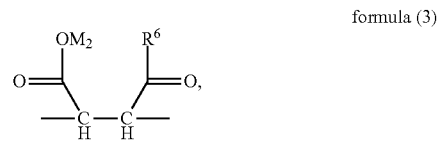

formula (3)

wherein, $R^6$ is selected from

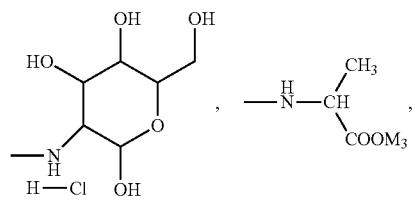

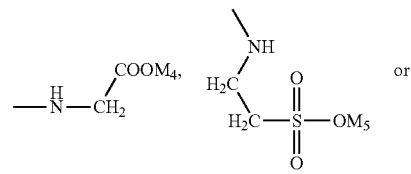

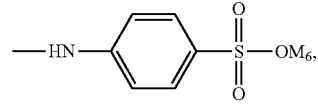

and $M_2$-$M_6$ are H, $NH_4$, Na or K respectively and independently;

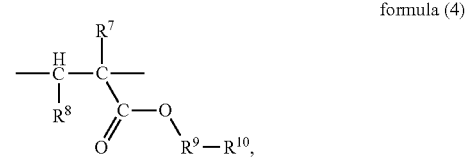

formula (4)

wherein, $R^7$ and $R^8$ are H or $C_1$-$C_6$ alkyl respectively and independently, $R^9$ is —$C_nH_{2n}$—, n is an integer within a range of 2-6, and $R^{10}$ is formula (5)

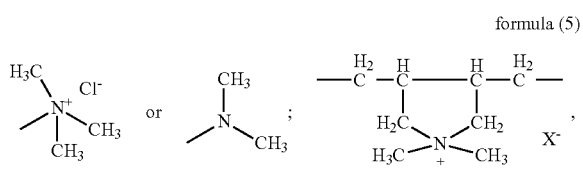

wherein, X is halogen.

In the above random copolymer provided in the present invention, in the part

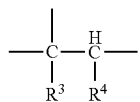

of the structural unit (A), the chain —C—C— is connected into the main chain of the random copolymer. The part

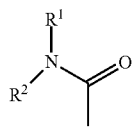

(amido) of the structural unit (A) serves as a side group of the structural unit (A).

In the present invention, $R^1$ and $R^2$ are H or $C_1$-$C_6$ alkyl respectively and independently, wherein, the alkyl may be substituted or unsubstituted linear or branched alkyl, including, but not limited to methyl, ethyl, n-propyl, iso-propyl, tert-butyl, n-butyl, amyl or n-hexyl. $R^3$ and $R^4$ are H or $C_1$-$C_3$ alkyl respectively and independently, wherein, the alkyl may be substituted or unsubstituted linear or branched alkyl, including, but not limited to methyl, ethyl, n-propyl or iso-propyl. Preferably, in the formula (1), $R^1$ and $R^2$ may be H, or $R^1$ may be methyl and $R^2$ may be H; $R^3$ and $R^4$ may be H, or $R^4$ may be methyl and $R^3$ may be H. More preferably, $R^1$-$R^4$ is H.

In the part

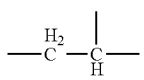

of the structural unit (B), the chain —C—C— is connected into the main chain of the random copolymer. The part

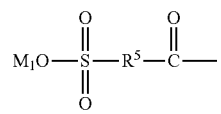

of the structural unit (B) serves as a side chain of the structural unit (B). The oxygen or nitrogen element in $R^5$ is linked with

to form an acyloxy or amido group. Preferably, in the definition of $R^5$, m=4, and R is —C(CH$_3$)$_2$—CH$_2$—. Preferably, in the formula (2), $R^5$ is —O—C(CH$_3$)$_2$—CH$_2$- 或 —NH—C(CH$_3$)$_2$—CH$_2$—. Preferably, the structural unit (B) may be

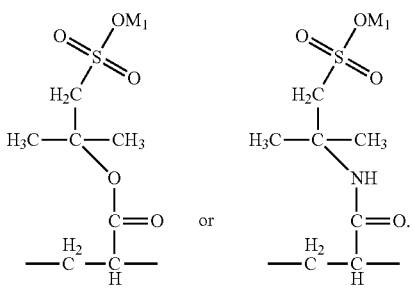

$M_1$ is H, NH$_4$, Na or K, and may be cations partially carried into the system when the polymerization solution is prepared with alkaline liquor in the process of polymerization of the random copolymer.

In the part

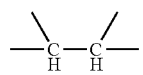

of the structural unit Ⓒ, the chain —C—C— is connected into the main chain of the random copolymer. The parts

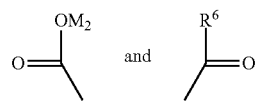

and of the structural unit Ⓒ serve as side chains of the structural unit (C). $M_2$ is H, NH$_4$, Na or K, and may be cations partially carried into the system when the polymerization solution is prepared with alkaline liquor in the process of polymerization of the random copolymer. Preferably, $R^6$ is

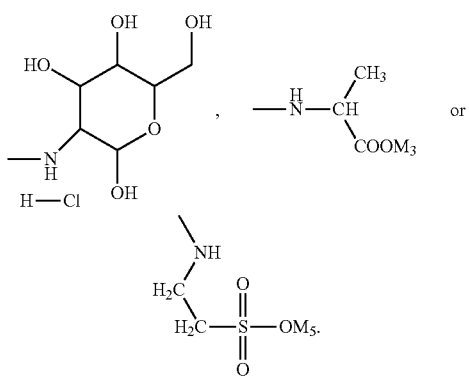

Accordingly, the formula (3) is

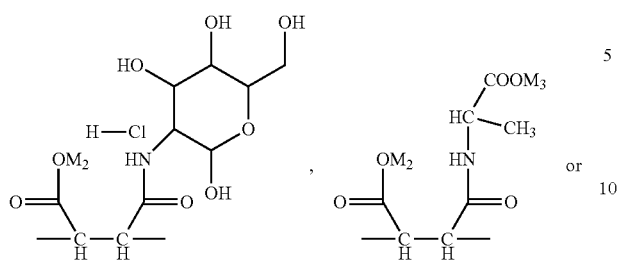,

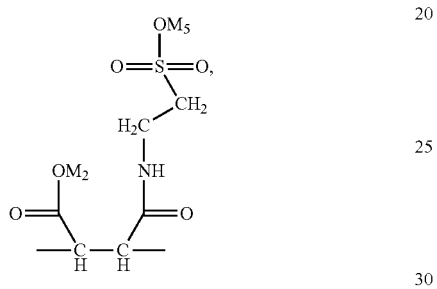

where, $M_2$, $M_3$ and $M_5$ may be H, $NH_4$, Na or K, and may be cations partially carried into the system when the polymerization solution is prepared with alkaline liquor in the process of polymerization of the random copolymer.

The structural unit (D) may be selected from a structure represented by formula (4) or (5). In the formula (4), the chain —C—C— in the part

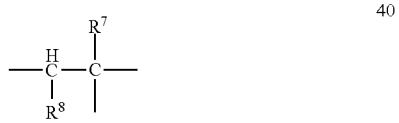

is connected into the main chain of the random copolymer. The part

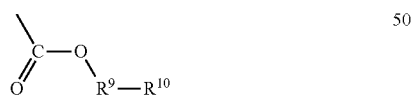

in the formula (4) serves as a side chain of the structural unit (D). Preferably, in the formula (4) $R^7$ and $R^8$ are H or methyl respectively and independently, and $R^9$ is —$CH_2CH_2$—. Accordingly, the structure represented by formula (4) is

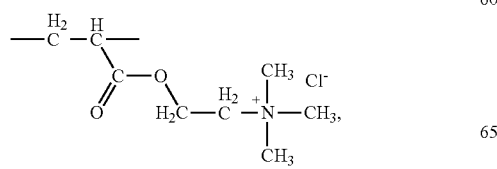

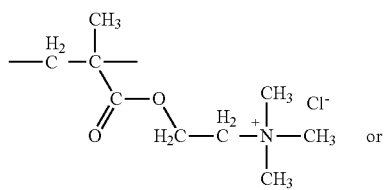

In the formula (5), the part

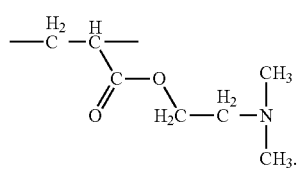

is connected into the main chain of the random copolymer. The part

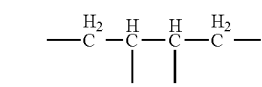

in the formula (5) serves as a side chain of the structural unit (D); preferably, in the formula (5), X is Cl. Accordingly, the structure represented by formula (5) is

According to the present invention, the random copolymer may contain structural unit (A), structural unit (B), structural unit (C) and structural unit (D) that are linked randomly. The random copolymer may be obtained through free radical polymerization reactions of corresponding monomers that can provide structural unit (A), structural unit (B), structural unit (C) and structural unit (D). Preferably, the structure of the random copolymer may be represented by the following formula:

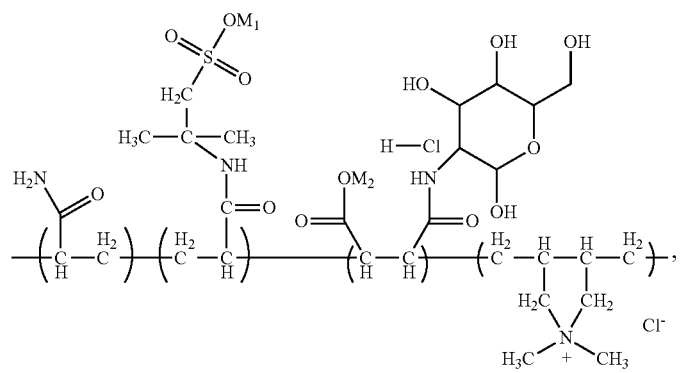
A B C D
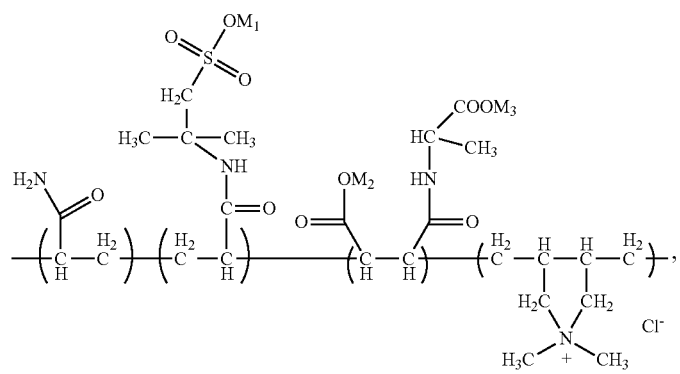
A B C D
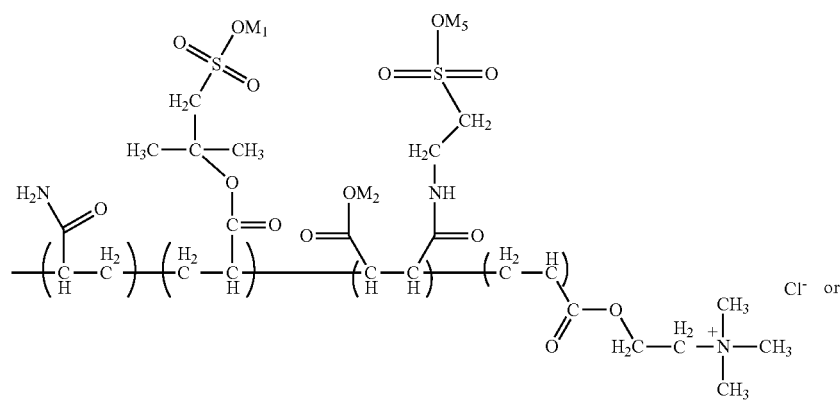
A B C D
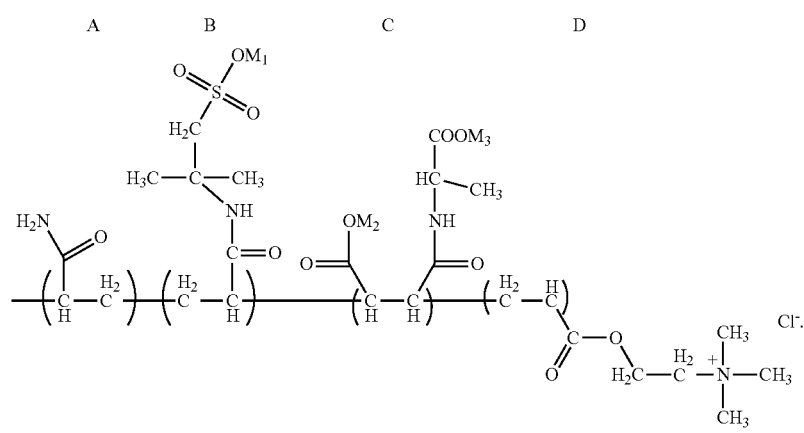
A B C D

Wherein, A, B, C and D represent the structural unit (A), structural unit (B), structural unit (C), and structural unit (D) contained in the random copolymer respectively. These structure units can be linked up randomly to form the main chain of the copolymer.

In the present invention, the monomer (a), monomer (b), monomer (c) and monomer (d) used in the following methods are used, the monomers have vinyl terminals, and the vinyl groups in the monomers can be bonded to each other through free radical polymerization to form the random copolymer that have the above-mentioned structure. In addition, in the present invention, the proportions of the polymerized monomers may be ascertained through $^{13}$C-NMR, $^{1}$H-NMR and elemental analysis, and NMR analysis of the residue after the polymerization product is separated, and thereby the random copolymer is proved as a substance having the above-mentioned structure through comprehensive analysis.

According to the present invention, the relative molecular weights of the compounds may be ascertained from the apparent viscosity of the random copolymer. Preferably, the apparent viscosity of the random copolymer prepared into water solution at 1 wt % concentration is 10-40 mPa·s. The water solution is solution that contains 1 wt % random copolymer. The apparent viscosity may be measured with the method specified in ISO 10416:2008 "Recommended Practice for Laboratory Testing of Drilling Fluids".

According to the present invention, the contents of the structural units in the random copolymer may be determined appropriately, as long as the object of the present invention can be attained. Preferably, based on the total weight of the random copolymer, the random copolymer contains 30-50 wt % structural unit (A), 40-60 wt % structural unit (B), 2-10 wt % structural unit (C), and 1-10 wt % structural unit (D). Preferably, the random copolymer contains 35-45 wt % structural unit (A), 45-55 wt % structural unit (B), 3-8 wt % structural unit (C), and 2-6 wt % structural unit (D).

More preferably, the random copolymer contains 37-41.4 wt % structural unit (A), 48.2-54.4 wt % structural unit (B), 4.1-9.9 wt % structural unit (C), and 1.8-4.8 wt % structural unit (D).

In a second aspect, the present invention provides a method for preparing a random copolymer, which comprises:
under nitrogen shielding and in the presence of an initiator, a monomer (a) represented by formula (6), a monomer (b) represented by formula (7), a monomer (c) represented by formula (8), and monomer (d) represented by formula (9) or (10) are controlled to have free radical copolymerization reactions;

formula (6)
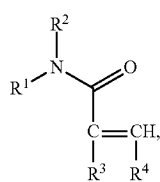

wherein, $R^1$ and $R^2$ are H or $C_1$-$C_6$ alkyl respectively and independently, and $R^3$ and $R^4$ are H or $C_1$-$C_3$ alkyl respectively and independently;

formula (7)
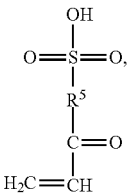

wherein, $R^5$ is —O—R— or —NH—R—, wherein, R is —$C_mH_{2m}$—, m=4, 5 or 6;

formula (8)
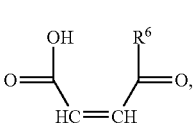

wherein, $R^6$ is selected from

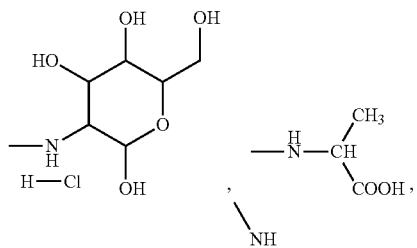

formula (9)
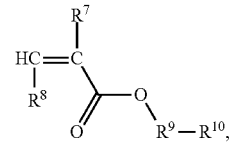

wherein, $R^7$ and $R^8$ are H or $C_1$-$C_6$ alkyl respectively and independently, $R^9$ is —$C_nH_{2n}$—, n is an integer within a range of 2-6, and $R^{10}$ is formula (10)
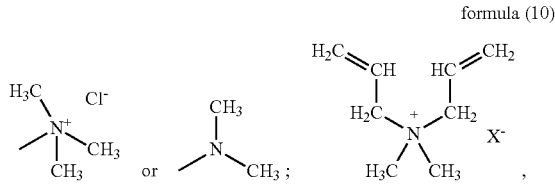

wherein, X is halogen.

According to the present invention, preferably, the monomers are dosed as follows: the monomer (a) is 20-50 pbw, the monomer (b) is 40-70 pbw, the monomer (c) is 1-10 pbw, and the monomer (d) is 0.5-8 pbw. Preferably, the monomers are dosed as follows: the monomer (a) is 35-42 pbw, the monomer (b) is 45-55 pbw, the monomer (c) is 3-7 pbw, and the monomer (d) is 1-5 pbw. The monomers are dosed so that the obtained random copolymer has the required structural units.

In the present invention, preferably the monomer (a) defines that the $R^1$-$R^4$ in the formula (6) are H, and specifically may be acrylamide.

In the present invention, preferably the monomer (b) may define that the $R^5$ in the formula (7) is —O—C(CH$_3$)$_2$—CH$_2$— or —NH—C(CH$_3$)$_2$—CH$_2$—, equivalent to: m=4, R is —C(CH$_3$)$_2$—CH$_2$—. Accordingly, preferably the monomer (b) is 2-acrylamido-2-methyl propanesulfonic acid or 2-acryloxy-2-methyl propanesulfonic acid.

In the present invention, the monomer (c) that may correspond to the structure represented by formula (8) may be at least one of N-glucose hydrochloride maleamic acid, N-isopropionyloxy maleamic acid, N-acetoxy maleamic acid, N-ethylsulfonyl maleamic acid, and N-benzenesulfonic maleamic acid. Preferably, in the formula (8), $R^6$ is

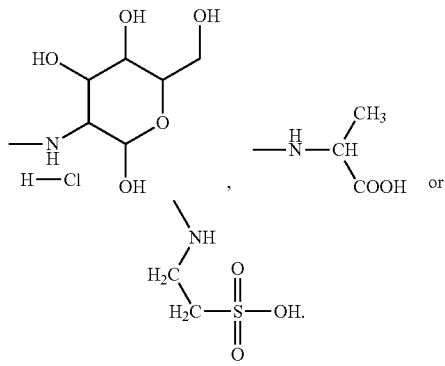

Preferably, the monomer corresponding to the structure represented by formula (8) is

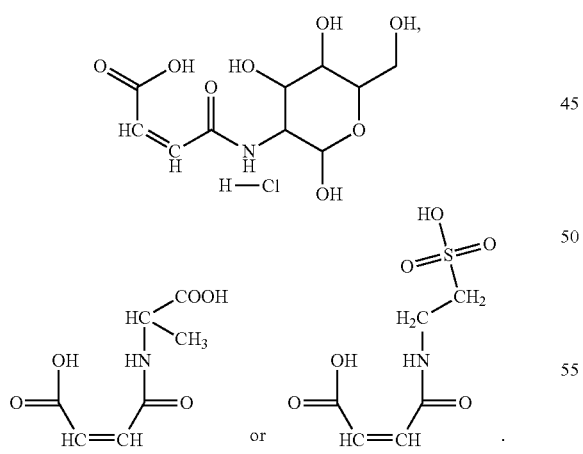

Accordingly, the monomer (c) is at least one of N-glucose hydrochloride maleamic acid, N-isopropionyloxy maleamic acid, and N-ethylsulfonyl maleamic acid. The monomer (c) can provide specific structural units in the prepared random copolymer, so that the random copolymer has good calcium salt-tolerant and temperature-tolerant performance. The monomer (c) may be obtained through a synthetic reaction between maleic anhydride and a corresponding compound.

The corresponding compound may be glucosamine hydrochloride, α-alanine, aminoacetic acid, taurine acid, or aminobenzenesulfonic acid. The monomer (c) may be prepared with the method disclosed as followings. Preferably, the N-glucose hydrochloride maleamic acid that has a structure represented by

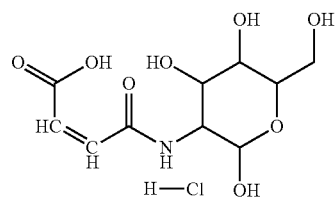

may be prepared with the method disclosed as following.

Specifically, the method for preparing the N-glucose hydrochloride maleamic acid monomer may comprise:
1) Dissolving C mol glucosamine hydrochloride in B1 mL solvent;
2) Mixing A mol maleic anhydride with B2 mL solvent; adding the solution obtained in the step
  1) by dropwise adding while stirring;
3) Stirring till white precipitate is generated through the reaction and the white precipitate no longer increases;
4) Filtering by suction filtration, washing, and drying, to obtain N-glucose hydrochloride maleamic acid;
wherein, A:(B1+B2):C=(1-1.4):(40-120):1;
the solvent is tetrahydrofuran, glacial acetic acid, propionic acid or dimethyl formamide.

In the step 3), the reaction temperature is 25-50° C., and the reaction time is 1-6 h; more preferably, the reaction temperature is 30° C., and the reaction time is 4 h.

The reaction equation is as follows:

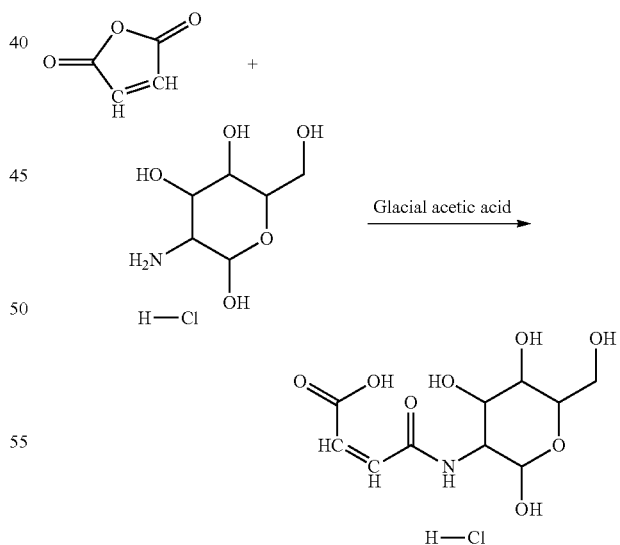

In the present invention, specifically, the method for preparing the N-glucose hydrochloride maleamic acid may include the following steps:

A mol maleic anhydride and B1 mL solvent are added into a dry three-neck flask, C mol glucosamine hydrochloride dissolved in additional B2 mL solvent is added by dropwise adding while the mixture is stirred, then the mixture is stirred for 4 h at 30° C. for reaction; suction filtration-washing-suction filtration-drying are executed after white precipitate is generated and the white precipitate doesn't increase anymore; thus, N-glucose hydrochloride maleamic acid is obtained; wherein, A:(B1+B2):C=(1-1.4):(40-120):1.

The structure of glucosamine hydrochloride has a six-membered ring and multiple hydroxyl groups. By introducing that structure into the structure of the monomer, the water solubility of the monomer (c) an be improved; besides, the random copolymer obtained through copolymerization from the monomer has improved tolerance to small-molecule electrolytes and high temperature.

Other preferred monomers for the monomer (c) may be prepared with the above-mentioned preparation method of N-glucose hydrochloride maleamic acid simply by replacing the glucosamine hydrochloride in the reactants with α-alanine or taurine acid.

In the present invention, if the monomer (d) is the compound represented by formula (9), preferably the $R^7$ and $R^8$ in the formula (9) may be defined as H or methyl respectively and independently, and the R9 may be defined as —$CH_2CH_2$—. Preferably, the structure represented by formula (9) may be

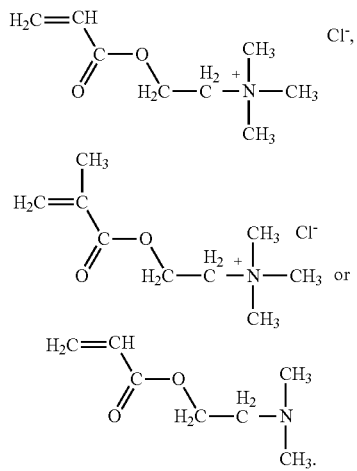

Accordingly, preferably the monomer (d) represented by formula (9) may be acryloyloxyethyl trimethyl ammonium chloride, methyl-acryloyloxyethyl trimethyl ammonium chloride or N,N-dimethylaminoethyl acrylate. If the monomer (d) is the structure represented by formula (10), preferably X is Cl, and the monomer (d) may be dimethyldiallyl ammonium chloride. In summary, the monomer (d) may be selected from at least one of acryloyloxyethyl trimethyl ammonium chloride, methyl-acryloyloxyethyl trimethyl ammonium chloride, dimethyldiallyl ammonium chloride, and N,N-dimethylaminoethyl acrylate.

According to the present invention, the initiator can initiate the free radical copolymerization reaction of the monomers. Preferably, the initiator is selected from oxidation-reduction initiators and/or azo initiators.

Preferably, the oxidation-reduction initiator comprises at least one of ammonium persulfate, potassium persulfate, and hydrogen peroxide, and sodium bisulfite; or comprises ammonium persulfate and/or potassium persulfate and organic amine. The oxidation-reduction initiator may be classified into main initiator and auxiliary initiator, wherein, the main initiator may comprise at least one of ammonium sulfate, potassium persulfate and hydrogen peroxide; the auxiliary initiator may comprise sodium bisulfite or organic amine. The organic amine may be at least one of tetramethyl ethylene diamine and/or tetramethyl-1,3-propylene diamine, preferably is tetramethyl ethylene diamine. The azo initiator may be a water-soluble azo initiator, and preferably is 2,2'-azobis[2-(2-imidazolin-2-yl)propane] dihydrochloride and/or 2,2'-azobis[2-methylpropionamidine] dihydrochloride.

In the present invention, the dose of the initiator may be adjusted according to the actual requirement, as long as it can initiate the free radical copolymerization reaction to obtain a random copolymer composed of required structural units. Preferably, the total dose of the oxidation-reduction initiator is 0.1-1.6 wt % of the total weight of all monomers, preferably is 0.3-1.5 wt % of the total weight of all monomers. Wherein, the dose of the main initiator may be 0.1-0.8 wt % of the total weight of all monomers, preferably is 0.1-0.7 wt %, more preferably is 0.3-0.7 wt %. The auxiliary initiator may be dosed in a way that the molar ratio of the auxiliary initiator to the main initiator is maintained with a range of (0.8-1):1. The total dose of the azo initiator is 0.1-1.6 wt % of the total weight of all monomers, preferably is 0.3-1.5 wt %.

In a preferred embodiment of the preparation method of the random copolymer provided in the present invention, the method for free radical copolymerization reaction of the monomer (a), monomer (b), monomer (c) and monomer (d) comprises:

adding the monomers into alkaline liquor and dissolving them to a homogeneous state, and then charging nitrogen to remove oxygen, to obtain mixed solution of the monomers; adjusting the temperature of the mixed solution of the monomers to 40° C.-75° C., and adjusting the pH to 5-10; then adding the initiator to initiate the copolymerization reaction and maintaining the copolymerization reaction for 0.2-4 h, to obtain a gelatinous product; pelleting, drying, and pulverizing the gelatinous product.

Specifically, (i) alkaline liquor is prepared as follows: alcali is added in appropriate amount into deionized water while the mixture is stirred, and then the mixture is stirred further till the alcali is dissolved homogeneously, so that the alkaline liquor is obtained; the alcali may be at least one of sodium hydroxide, potassium hydroxide and ammonia; the pH of the alkaline liquor is not lower than 7.

(ii) The monomer (a), monomer (b), monomer (c) and monomer (d) are added sequentially into the alkaline liquor under a stirring condition, nitrogen is charged to remove oxygen (the nitrogen charging time may be 0.5-2 h) after the monomers are dissolved homogeneously, to obtain mixed solution of the monomers. In the mixed solution of the monomers, the total weight concentration of the monomer (a), monomer (b), monomer (c) and monomer (d) is 20-60 wt %, preferably is 30-50 wt %; the nitrogen charging time preferably is 1-2 h.

Wherein, the material charging sequence may have significant influences on the performance of the product. The above-mentioned charging sequence in the present invention can effectively avoid situations that may have impacts on the performance of the product, such as subsidiary reactions of some monomers incurred by extremely high pH value and self-polymerization of some monomers incurred by extremely low pH value of the system, etc., and thereby ensure the performance of the product.

(iii) The temperature of the mixed solution of the monomer is adjusted to 40-75° C., preferably 50-60° C.; the pH is adjusted to 5-10, preferably 7-9; then an initiator is added, the stirring rate is decreased after the initiator is dissolved, and polymerization reaction may be executed for 0.2-4 h, preferably 1-2 h, to obtain a gelatinous product.

(iv) The gelatinous product obtained in the step (iii) is pelletized, dried, and pulverized, to obtain the calcium-tolerant and temperature-tolerant filter loss reducer for drilling fluid. Wherein, the drying temperature may be 60-120° C., preferably is 70-100° C.; the drying time may be 24-36 h, preferably is 24-30 h.

In a third aspect, the present invention provides a random copolymer prepared with the preparation method disclosed in the present invention. The random copolymer may have the structural unit (A), (B), (C) and (D) as described above, and will not be further detailed here.

In a fourth aspect, the present invention provides a use of the random copolymer provided in the present invention in drilling fluids.

According to the present invention, preferably, the random copolymer is added as a filter loss reducer for drilling fluid into the base mud of drilling fluid; with respect to 100 mL base mud of drilling fluid, the dose of the random copolymer is 0.5-4 g.

In a fifth aspect, the present invention provides a drilling fluid, which comprises the random copolymer provided in the present invention as a filter loss reducer and base mud, wherein, with respect to 100 mL base mud, the dose of the random copolymer is 0.5-4 g.

In the present invention, the drilling fluid may be a water-based drilling fluid. The base mud may contain components that are commonly used in water-based drilling fluids in the art, including, but not limited to mud-making soil, pH adjustor, flow pattern regulator, anti-collapse agent, lubricant, and weighting agent, etc. The doses of the above-mentioned components in the base mud may be conventionally defined values with respect to 100 mL water in the art. For example, the dose of the mud-making soil may be 0.5-3 g, the dose of the flow pattern regulator may be 1-4 g, the dose of the anti-collapse agent may be 2-5 g, the dose of the lubricant may be 2-5 g, and the dose of the weighting agent may be 0-140 g (corresponding to 1.0-2.0 g/cm$^3$ drilling fluid density, weighted with barite). The pH adjustor controls the pH of the drilling fluid at 8-10.

Here under the present invention will be detailed in embodiments.

The raw materials used in the following embodiments are as follows:

2-acrylamido-2-methyl propanesulfonic acid: from Shouguang Runde Chemical Co., Ltd.;

Acrylamide: from Jiangxi Changjiu Agrochemical Co., Ltd.;

Monomer (c):

The N-glucose hydrochloride maleamic acid is prepared with the method disclosed as following: 1.4 mol maleic anhydride is added into a dry three-neck round flask, 40 mL glacial acetic acid is added into the flask to dissolve the maleic anhydride fully, the remaining 40 mL glacial acetic acid solution in which 1.0 mol glucosamine hydrochloride is dissolved is added slowly by dropwise adding into the flask under a stirring condition, and then the mixture is stirred for 3 h at 25° C. for reaction; after white precipitate is generated, suction filtration-washing-suction filtration-drying are carried out, to obtain white powder. Analyzed through infrared spectroscopy and $^1$H-NMR spectroscopy, the obtained white powder is N-glucose hydrochloride maleamic acid; through weighing and calculation, the yield ratio is ascertained to be 77%. The melting point of the product is 171° C.

The N-isopropionyloxy maleamic acid is prepared with the method disclosed as following: 1.2 mol maleic anhydride is added into a dry three-neck round flask, 50 mL glacial acetic acid is added into the flask to dissolve the maleic anhydride fully, the remaining 40 mL glacial acetic acid solution in which 1.0 mol α-alanine is dissolved is added slowly by dropwise adding into the flask under a stirring condition, and then the mixture is stirred at a low stirring rate at 30° C. for 3 h for reaction, so that white precipitate is generated gradually. After the reaction is finished, suction filtration, washing, further suction filtration and vacuum drying are carried out, to obtain N-isopropionyloxy maleamic acid; through weighing and calculation, the yield ratio is ascertained to be 80%;

The N-ethylsulfonyl maleamic acid is prepared with the method disclosed as following: 1.1 mol maleic anhydride is added into a dry three-neck round flask, 50 mL glacial acetic acid is added into the flask to dissolve the maleic anhydride fully; 35 mL glacial acetic acid solution in which 1.0 mol taurine acid is dissolved is added slowly under a stirring condition. The mixture is stirred at 35° C. for 3 h for reaction, so that white precipitate is generated gradually. After the reaction is finished, suction filtration, washing, further suction filtration and vacuum drying are carried out, to obtain N-ethylsulfonyl maleamic acid; through weighing and calculation, the yield ratio is ascertained to be 70%.

Water solution of acryloyloxyethyl trimethyl ammonium chloride: 30% content, from Shandong Xuxiang Chemical Co., Ltd.;

Dimethyldiallyl ammonium chloride: from TCI;

Ammonium persulfate: from Sinopharm Chemical Reagents Co., Ltd.;

Sodium bisulfite: from Sinopharm Chemical Reagents Co., Ltd.;

Sodium hydroxide: from Sinopharm Chemical Reagents Co., Ltd.;

Ammonia: from Sinopharm Chemical Reagents Co., Ltd.;

Calcium chloride: from Sinopharm Chemical Reagents Co., Ltd.;

Sodium bentonite: from Xinjiang Xiazijie Bentonite Co., Ltd.;

Calcium bentonite: from Hebei Xuanhua Hongyu Bentonite Co., Ltd.

The structure of the random copolymer obtained in this embodiment is analyzed through $^{13}$C-NMR, $^1$H-NMR and elemental analysis, the residue after the polymerization product is separated is analyzed to ascertain the proportion of monomers that are not polymerized; thus, the random copolymer is ascertained through comprehensive analysis; the contents of the structures in the random copolymer are ascertained from the material input.

The apparent viscosity of 1% water solution of the random copolymer is measured with the method specified in ISO 10416:2008 "Recommended Practice for Laboratory Testing of Drilling Fluids".

Example 1

(1) 4 g sodium hydroxide is dissolved in 100 g water to obtain 104 g alkaline liquor;
(2) 22 g 2-acrylamido-2-methyl propanesulfonic acid, 20 g acrylamide, 2 g N-glucose hydrochloride maleamic acid, and 2 g dimethyldiallyl ammonium chloride are added into the alkaline liquor respectively, and are dissolved homogeneously. Nitrogen is charged for 0.5 h to remove oxygen; thus, a mixed solution of the monomers is obtained, and the pH of the mixed solution is 8;
(3) 0.31 g initiator V-044 (2,2'-azobis[2-(2-imidazolin-2-yl) propane] dihydrochloride) is added into the mixed solution of monomers under conditions of 45° C. temperature and pH=8 to initiate the free radical polymerization reaction, and the reaction is maintained for 1 h to obtain a gelatinous product,
(4) The gelatinous product is sheared and pelletized, and then is dried at 65° C. for 36 h; thus, a solid product is obtained; then the solid product is pulverized.

Through analysis, it is ascertained that the obtained solid product is a random copolymer that has the following structural composition:

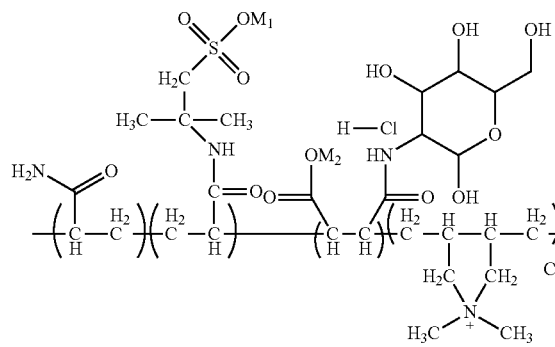

A    B    C    D

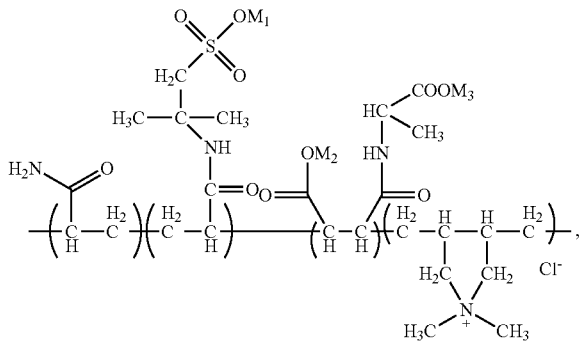

A    B    C    D wherein $M_1$ and $M_2$ are Na. The apparent viscosity of 1 wt % water solution of the random copolymer is 31 mPa·s.

Calculated according to the material input, in the random copolymer, the content of the structural unit (A) is 41.4 wt %, the content of the structural unit (B) is 50.4 wt %, the content of the structural unit (C) is 4.1 wt %, and the content of the structural unit (D) is 4.1 wt %.

Example 2

(1) 7 g sodium hydroxide is added into 100 g water, and the mixture is stirred till the sodium hydroxide is dissolved homogeneously; thus, 107 g alkaline liquor is obtained;
(2) 30 g 2-acrylamido-2-methyl propanesulfonic acid, 23 g acrylamide, 3 g N-isopropionyloxy maleamic acid, and 3 g dimethyldiallyl ammonium chloride are added into the alkaline liquor respectively and are dissolved homogeneously, and then nitrogen is charged for 0.5 h to remove oxygen; thus, a mixed solution of the monomers is obtained, and the pH of the mixed solution is 9;
(3) 0.28 g APS (ammonium persulfate) and 0.25 g sodium bisulfite are added into the mixed solution of the monomers under the conditions of 50° C. temperature and pH=7 to initiate the free radical polymerization reaction, and the reaction is maintained for 1.5 h; thus, a gelatinous product is obtained;
(4) The gelatinous product is sheared and pelletized, and then is dried at 70° C. for 24 h; thus, a solid product is obtained; then the solid product is pulverized.

Through analysis, it is ascertained that the obtained solid product is a random copolymer that has the following structural composition:

wherein $M_1$, $M_2$ and $M_3$ are Na. The apparent viscosity of 1 wt % water solution of the random copolymer is 23 mPa·s.

In the random copolymer, the content of the structural unit (A) is 37.0 wt %, the content of the structural unit (B) is 54.4 wt %, the content of the structural unit (C) is 4.8 wt %, and the content of the structural unit (D) is 4.8 wt %.

Example 3

(1) 4 g sodium hydroxide is added into 100 g water, and the mixture is stirred till the sodium hydroxide is dissolved homogeneously; thus, 104 g alkaline liquor is obtained;
(2) 22 g 2-acryloxy-2-methyl propanesulfonic acid, 20 g acrylamide, 5 g N-ethylsulfonyl maleamic acid, and 4 g 30 wt % water solution of acryloxyethyltrimethyl ammonium chloride are added into the alkaline liquor respectively and are dissolved homogeneously, and then nitrogen is charged for 0.5 h to remove oxygen; thus, a mixed solution of the monomers is obtained, and the pH of the mixed solution is 7;
(3) 0.25 g ammonium persulfate and 0.30 g tetramethyl ethylene diamine are added into the mixed solution of the monomers under the conditions of 40° C. temperature and pH=7 to initiate the free radical polymerization reaction, and the reaction is maintained for 1.5 h; thus, a gelatinous product is obtained;
(4) The gelatinous product is sheared and pelletized, and then is dried at 105° C. for 24 h; thus, a solid product is obtained; then the solid product is pulverized.

Through analysis, it is ascertained that the obtained solid product is a random copolymer that has the following structural composition:

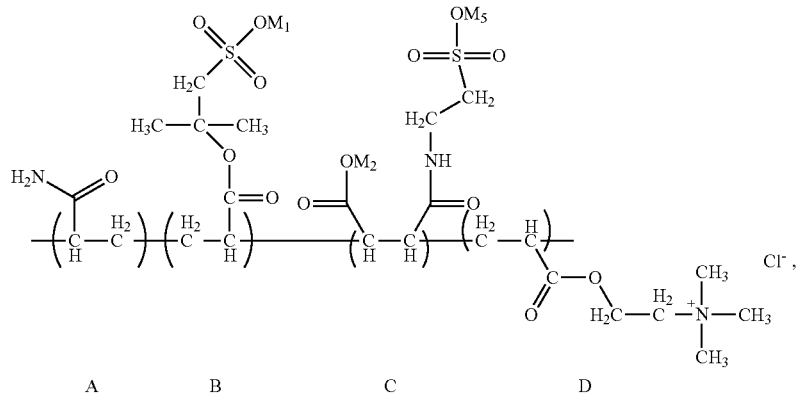

A    B    C    D wherein $M_1$ and $M_2$ are Na. The apparent viscosity of 1 wt % water solution of the random copolymer is 16 mPa·s.

The content of the structural unit (A) is 39.5 wt %, the content of the structural unit (B) is 48.2 wt %, the content of the structural unit (C) is 9.9 wt %, and the content of the structural unit (D) is 2.4 wt %.

Example 4

(1) 8 g potassium hydroxide is added into 100 g water, and the mixture is stirred till the sodium hydroxide is dissolved homogeneously; thus, 108 g alkaline liquor is obtained;
(2) 32 g 2-acrylamido-2-methyl propanesulfonic acid, 26 g acrylamide, 4 g N-isopropionyloxy maleamic acid, and 4 g 30 wt % water solution of acryloxyethyltrimethyl ammonium chloride are added into the alkaline liquor respectively and are dissolved homogeneously, and then nitrogen is charged for 0.5 h to remove oxygen; thus, a mixed solution of the monomers is obtained, and the pH of the mixed solution is 9;
(3) 0.38 g initiator V-044 (2,2'-azobis[2-(2-imidazolin-2-yl) propane] dihydrochloride) is added into the mixed solution of monomers under conditions of 50° C. temperature and pH-9 to initiate the free radical polymerization reaction, and the reaction is maintained for 0.5 h to obtain a gelatinous product;
(4) The gelatinous product is sheared and pelletized, and then is dried at 65° C. for 30 h; thus, a solid product is obtained; then the solid product is pulverized.

Through analysis, it is ascertained that the obtained solid product is a random copolymer that has the following structural composition:

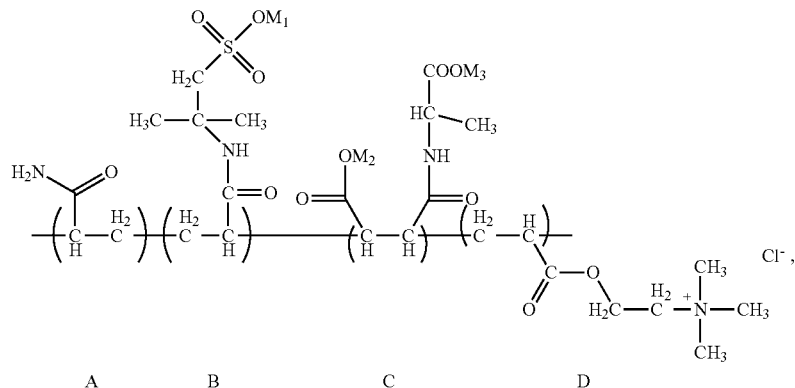

wherein $M_1$, $M_2$ and $M_3$ are K. The apparent viscosity of 1 wt % water solution of the random copolymer is 37 mPa·s.

The content of the structural unit (A) is 39.0 wt %, the content of the structural unit (B) is 53.2 wt %, the content of the structural unit (C) is 6.0 wt %, and the content of the structural unit (D) is 1.8 wt %.

Comparative Example 1

The method described in the example 1 is used, but "22 g 2-acrylamido-2-methyl propanesulfonic acid, 20 g acrylamide, 2 g N-glucose hydrochloride maleamic acid, and 2 g dimethyldiallyl ammonium chloride are added" in the step (2) is replaced with "22 g 2-acrylamido-2-methyl propanesulfonic acid, 20 g acrylamide, and 2 g dimethyldiallyl ammonium chloride are added". The free radical polymerization reaction is executed.

After the obtained solid product is analyzed, it is ascertained that the product of the polymerization reaction is a random copolymer that has the following structure:

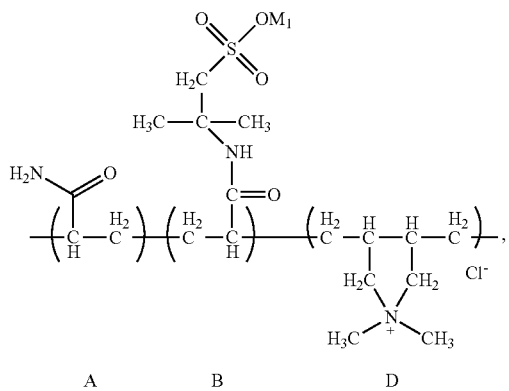

where, $M_1$ is Na. The apparent viscosity of 1 wt % water solution of the random copolymer is 40 mPa·s.

Calculated according to the material input, in the random copolymer, the content of the structural unit (A) is 43.2 wt %, the content of the structural unit (B) is 52.5 wt %, and the content of the structural unit (D) is 4.3 wt %.

Comparative Example 2

The method described in the example 2 is used, but "30 g 2-acrylamido-2-methyl propanesulfonic acid, 23 g acrylamide, 3 g N-isopropionyloxy maleamic acid, and 3 g dimethyldiallyl ammonium chloride are added" in the step (2) is replaced with "30 g 2-acrylamido-2-methyl propanesulfonic acid, 23 g acrylamide, and 3 g dimethyldiallyl ammonium chloride are added". The free radical polymerization reaction is executed.

After the obtained solid product is analyzed, it is ascertained that the product of the polymerization reaction is a random copolymer that has the following structure:

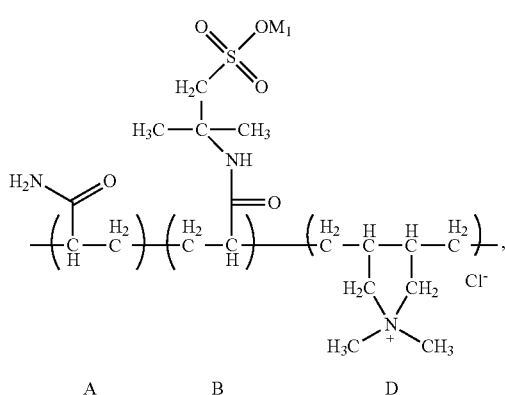

A  B  D wherein $M_1$ is Na. The apparent viscosity of 1 wt % water solution of the random copolymer is 31 mPa·s.

Calculated according to the material input, in the random copolymer, the content of the structural unit (A) is 38.9 wt %, the content of the structural unit (B) is 56.0 wt %, and the content of the structural unit (D) is 5.1 wt %.

Comparative Example 3

The method described in the example 3 is used, but "22 g 2-acryloxy-2-methyl propanesulfonic acid, 20 g acrylamide, 5 g N-ethylsulfonyl maleamic acid, and 4 g 30 wt % water solution of acryloxyethyltrimethyl ammonium chloride are added" in the step (2) is replaced with "22 g 2-acryloxy-2-methyl propanesulfonic acid, 20 g acrylamide, and 4 g 30 wt % water solution of acryloxyethyltrimethyl ammonium chloride". The free radical polymerization reaction is executed.

After the obtained solid product is analyzed, it is ascertained that the product of the polymerization reaction is a random copolymer that has the following structure:

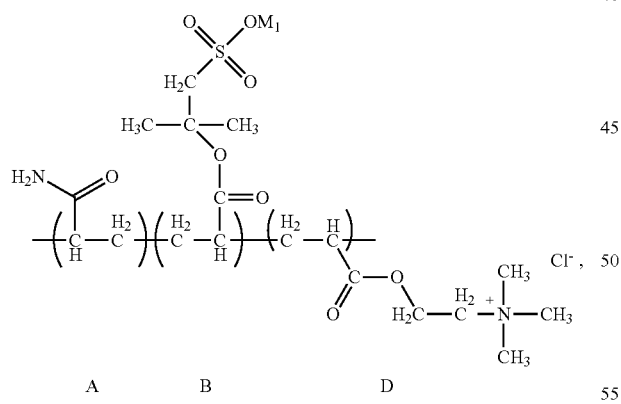

A  B  D wherein $M_1$ is Na. The apparent viscosity of 1 wt % water solution of the random copolymer is 23 mPa·s.

Calculated according to the material input, in the random copolymer, the content of the structural unit (A) is 43.9 wt %, the content of the structural unit (B) is 53.5 wt %, and the content of the structural unit (D) is 2.6 wt %.

Comparative Example 4

The method described in the example 4 is used, but "32 g 2-acrylamido-2-methyl propanesulfonic acid, 26 g acrylamide, 4 g N-isopropionyloxy maleamic acid, and 4 g 30 wt % water solution of acryloxyethyltrimethyl ammonium chloride are added" in the step (2) is replaced with "32 g 2-acrylamido-2-methyl propanesulfonic acid, 26 g acrylamide, and 4 g 30 wt % water solution of acryloxyethyltrimethyl ammonium chloride". The free radical polymerization reaction is executed.

After the obtained solid product is analyzed, it is ascertained that the product of the polymerization reaction is a random copolymer that has the following structure:

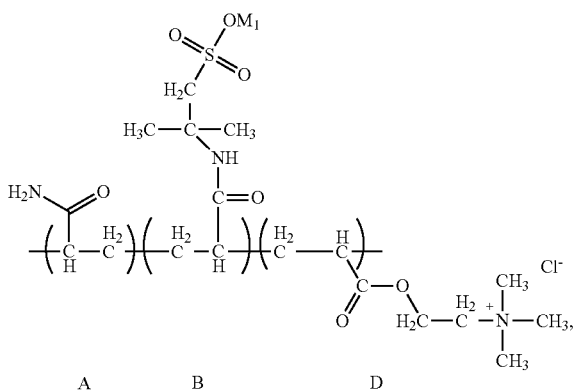

A  B  D wherein $M_1$ is Na. The apparent viscosity of 1 wt % water solution of the random copolymer is 39 mPa·s.

Calculated according to the material input, in the random copolymer, the content of the structural unit (A) is 41.5 wt %, the content of the structural unit (B) is 56.6 wt %, and the content of the structural unit (D) is 1.9 wt %.

Comparative Example 5

The method described in the example 1 is used, but "22 g 2-acrylamido-2-methyl propanesulfonic acid, 20 g acrylamide, 2 g N-glucose hydrochloride maleamic acid, and 2 g dimethyldiallyl ammonium chloride are added" in the step (2) is replaced with "22 g 2-acrylamido-2-methyl propanesulfonic acid, 20 g acrylamide, and 2 g N-glucose hydrochloride maleamic acid are added". The free radical polymerization reaction is executed.

After the obtained solid product is analyzed, it is ascertained that the product of the polymerization reaction is a random copolymer that has the following structure:

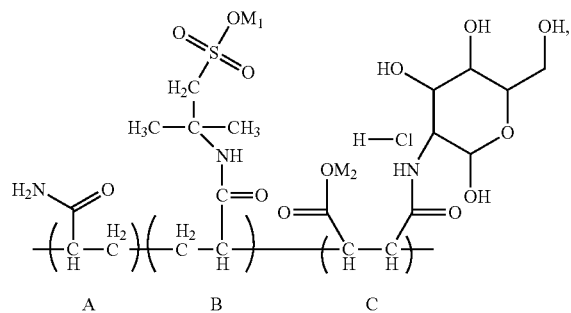

A  B  C wherein $M_1$ and $M_2$ are Na. The apparent viscosity of 1 wt % water solution of the random copolymer is 36 mPa·s.

Calculated according to the material input, in the random copolymer, the content of the structural unit (A) is 43.2 wt %, the content of the structural unit (B) is 52.5 wt %, and the content of the structural unit (C) is 4.3 wt %.

Assessment of Drilling Fluid Properties

The random copolymers prepared in the examples 1-4 and comparative examples 1-5 are added into different base muds to assess the drilling fluid properties. The test results are shown in Table 1.

1. Preparation of Base Muds:

(1) High-calcium bentonite brine base mud: 300 mL tap water is loaded into a high-speed stirring cup, 9 g sodium bentonite and 1.05 g sodium carbonate are added into the cup while the mixture is stirred at a high speed; then the mixture is stirred intensively for 20 min., and held at normal temperature for 24 h for hydration; next, 24 g calcium chloride is added while the mixture is stirred at a high speed, and then the mixture is stirred further at a high speed for 20 min., and held for 4 h for hydration; thus, high-calcium bentonite brine base mud (with $2.88 \times 10^4$ mg/L calcium ion content) is obtained.

(2) High-salinity compound brine base mud: 350 mL tap water is loaded into a high-speed stirring cup, 23.63 g NaCl, 2.63 g $CaCl_2$, and 6.9 g $MgCl_2 \cdot 6H_2O$ are added while the mixture is stirred at a high speed; 3.15 g $Na_2CO_3$ and 52.5 g calcium bentonite are added after the mixture is stirred at a high speed for 5 min., then the mixture is further stirred at a high speed for 20 min., and is held for 24 h for hydration; thus, high-salinity compound brine base mud (the total salinity is $32.64 \times 10^4$ mg/L, wherein, the content of calcium ions is 9,480 mg/L).

2. Performance Test:

The base mud that is prehydrated is stirred at a high speed for 20 min, loaded into a high temperature aging tank and aged for 16 h by hot rolling at 150° C.; the readings at 600 rpm and 300 rpm on a six-speed viscometer are taken and medium-pressure water loss is measured as the performance of the base mud.

In the prehydrated high-calcium bentonite brine base mud and high-salinity compound brine base mud, 0.9 wt % or 1.2 wt % samples in the embodiments and reference examples are added respectively, and the mixture is stirred at a high speed for 30 min, to ensure the sample is dissolved fully; then, the mixture is loaded into a high temperature aging tank and aged by hot rolling for 16 h at 150° C.; then, the viscosity and filter loss properties of the sample are measured (the filter loss property is tested with the method specified in ISO 10416:2008 "Recommended Practice for Laboratory Testing of Drilling Fluids").

TABLE 1

| Doses of different base muds + samples | | AV, mPa·s | PV, mPa·s | Fluid loss, mL |
|---|---|---|---|---|
| High-calcium bentonite brine base mud + 0.9% sample | Base mud | 2 | 1.5 | 206 |
| | Example 1 | 5 | 4 | 10.0 |
| | Example 2 | 5.5 | 4.5 | 7.0 |
| | Example 3 | 6.5 | 5.5 | 11.6 |
| | Example 4 | 7.0 | 6.5 | 6.6 |
| | Comparative example 1 | 3.5 | 3 | 76.0 |
| | Comparative example 2 | 4 | 3 | 46.4 |
| | Comparative example 3 | 3 | 2.5 | 39.2 |
| | Comparative example 4 | 5.5 | 4 | 52.0 |
| | Comparative example 5 | 6 | 4.5 | 36 |

TABLE 1-continued

| Doses of different base muds + samples | | AV, mPa·s | PV, mPa·s | Fluid loss, mL |
|---|---|---|---|---|
| High-salinity compound brine base mud + 1.2% sample | Base mud | 3.5 | 3.0 | 170 |
| | Example 1 | 4 | 3 | 9.0 |
| | Example 2 | 4.5 | 4 | 8.4 |
| | Example 3 | 3.5 | 3.0 | 10.0 |
| | Example 4 | 4 | 3.5 | 7.0 |
| | Comparative example 1 | 3.5 | 3.0 | 68.0 |
| | Comparative example 2 | 4 | 3.5 | 55 |
| | Comparative example 3 | 3 | 2 | 62 |
| | Comparative example 4 | 4 | 3 | 79.0 |
| | Comparative example 5 | 4.5 | 3.5 | 56 |

The experimental results demonstrate that the filter loss reducer provided in the present invention has outstanding calcium-tolerant and temperature-tolerant performance. If the filter loss reducer is dosed at 0.9 wt % in bentonite brine mud that has high calcium chloride content, the water loss of the mud is decreased from 206 mL (no filter loss reducer is added) to 12 mL or a lower value after hot-roll aging at 150° C. for 16 h. If it is dosed at 1.2 wt % in high-salinity compound brine mud, the water loss of the mud is decreased from 170 mL (no filter loss reducer is added) to 10 mL or a lower value after hot-roll aging at 150° C. for 16 h. The results indicate that the calcium-tolerant and temperature-tolerant filter loss reducer provided in the present invention attain a good protective colloid effect under the condition of high-concentration calcium ions, can form flexible, thin and dense filter cakes that have low permeability, and thereby can reduce the filter loss of drilling fluids that have high content of calcium ions. The filter loss reducer is applicable to high-temperature (150° C.) and high-calcium drilling fluid systems.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A random copolymer containing structural unit (A) represented by formula (1), structural unit (B) represented by formula (2), structural unit (C) represented by formula (3), and structural unit (D) represented by formula (4) and/or formula (5),

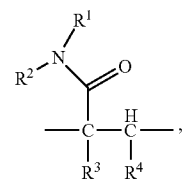

formula (1)

wherein $R^1$ and $R^2$ are H or $C_1$-$C_6$ alkyl respectively and independently, and $R^3$ and $R^4$ are H or $C_1$-$C_3$ alkyl respectively and independently;

formula (2)

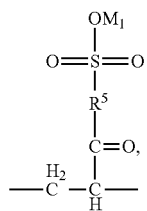

wherein $R^5$ is —O—R— or —NH—R—, wherein R is —$C_mH_{2m}$—, m=4, 5 or 6, and $M_1$ is H, $NH_4$, Na or K;

formula (3)

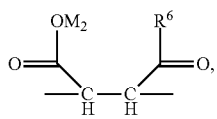

wherein $R^6$ is

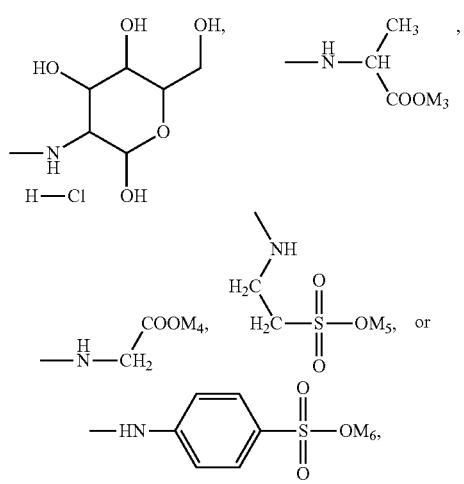

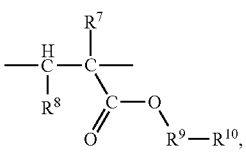

and $M_2$-$M_6$ are H, $NH_4$, Na or K respectively and independently;

formula (4)

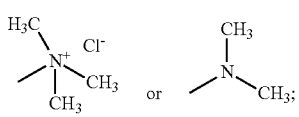

wherein $R^7$ and $R^8$ are H or $C_1$-$C_6$ alkyl respectively and independently, $R^9$ is —$C_nH_{2n}$—, n is an integer within a range of 2-6, and $R^{10}$ is

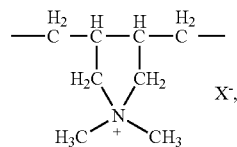

-continued formula (5)

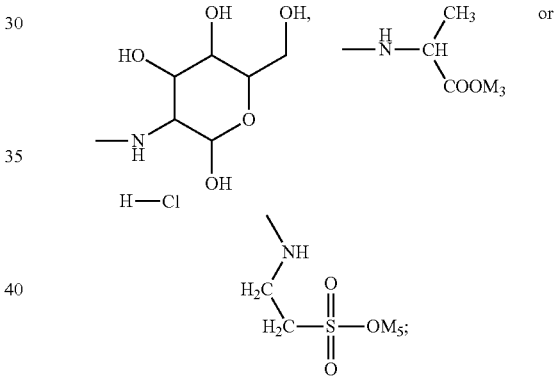

wherein X is halogen.

2. The random copolymer according to claim 1, wherein an apparent viscosity of aqueous solution of the random copolymer at 1 wt % concentration is 10-40 mPa·s.

3. The random copolymer according to claim 1, wherein, based on a total weight of the random copolymer, the random copolymer contains 30-50 wt % structural unit (A), 40-60 wt % structural unit (B), 2-10 wt % structural unit (C), and 1-10 wt % structural unit (D).

4. The random copolymer according to claim 3, wherein the random copolymer contains 35-45 wt % structural unit (A), 45-55 wt % structural unit (B), 3-8 wt % structural unit (C), and 2-6 wt % structural unit (D).

5. The random copolymer according to claim 1, wherein in the formula (1), $R^1$-$R^4$ is H; in the formula (2), $R^5$ is —O—C(CH$_3$)$_2$—CH$_2$— or —NH—C(CH$_3$)$_2$—CH$_2$—; in the formula (3), $R^6$ is in the formula (4), $R^7$ and $R^8$ are H or methyl respectively and independently, and $R^9$ is —CH$_2$CH$_2$—; in the formula (5), X is Cl.

6. A method for preparing a random copolymer comprising:
carrying out a copolymerization reaction of monomer (a) represented by formula (6), monomer (b) represented by formula (7), monomer (c) represented by formula (8), and monomer (d) represented by formula (9) and/or formula (10) under nitrogen shielding and in the presence of an initiator, formula (6)

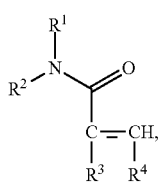

wherein $R^1$ and $R^2$ are H or $C_1$-$C_6$ alkyl respectively and independently, and $R^3$ and $R^4$ are H or $C_1$-$C_3$ alkyl respectively and independently;

formula (7)

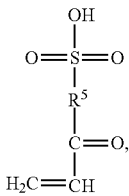

wherein $R^5$ is —O—R— or —NH—R—, wherein R is —$C_mH_{2m}$—, m=4, 5 or 6;

formula (8)

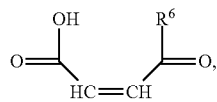

wherein $R^6$ is

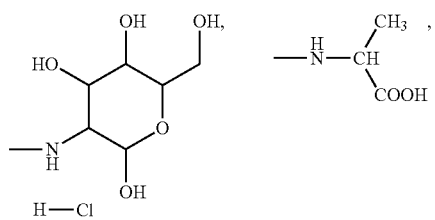

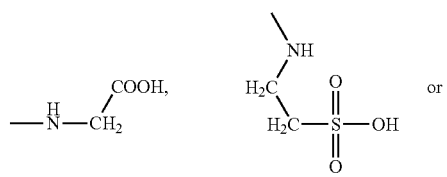

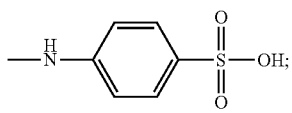

formula (9)

wherein $R^7$ and $R^8$ are H or $C_1$-$C_6$ alkyl respectively and independently, $R^9$ is —$C_nH_{2n}$—, n is an integer within a range of 2-6, and $R^{10}$ is

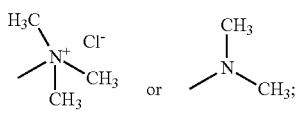

-continued formula (10)

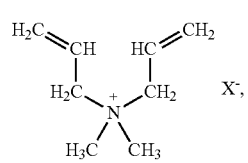

wherein X is halogen.

7. The method according to claim 6, wherein a dose of monomer (a) is 20-50 pbw, a dose of monomer (b) is 40-70 pbw, a dose of monomer (c) is 1-10 pbw, and a dose of monomer (d) is 0.5-8 pbw.

8. The method according to claim 7, wherein the dose of monomer (a) is 35-42 pbw, the dose of monomer (b) is 45-55 pbw, the dose of monomer (c) is 3-7 pbw, and the dose of monomer (d) is 1-5 pbw.

9. The method according to claim 6, wherein in formula (6), $R^1$-$R^4$ are H; in formula (7), $R^5$ is —O—C(CH$_3$)$_2$—CH$_2$— or —NH—C(CH$_3$)$_2$—CH$_2$—; in formula (8), $R^6$ is in formula (9), $R^7$ and $R^8$ are H or methyl respectively and independently, and $R^9$ is —CH$_2$CH$_2$—; in the formula (10), X is Cl.

10. The method according to claim 6, wherein the initiator is selected from oxidation-reduction initiators and/or azo initiators.

11. The method according to claim 6, wherein a doge of the initiator is 0.1-1.6 wt % of the total weight of all monomers.

12. The method according to claim 11, wherein the dose of the initiator is 0.3-1.5 wt % of the total weight of all monomers.

13. The method according to claim 6, wherein the method for free radical copolymerization reactions comprises:
  dissolving monomer (a), monomer (b), monomer (c) and monomer (d) in an alkaline liquor to form a homogeneous mixture, and then charging nitrogen to the homogenous mixture to remove oxygen, and obtain a mixed solution of the monomers;
  adjusting the temperature of the mixed solution of the monomers to 40° C.–75° C., and
  adjusting a pH of the mixed solution of the monomers to 5-10; then adding the initiator to initiate the copolymerization reaction and maintaining the copolymerization reaction for 0.2-4 hrs, to obtain a gelatinous product; and
  pelleting, drying, and pulverizing the gelatinous product.

14. The method according to claim 13, wherein in the mixed solution of the monomers, a total weight concentration of monomer (a), monomer (b), monomer (c), and monomer (d) is 20-60 wt %.

15. The method according to claim 13, wherein the drying is carried out at a temperature of 60-120° C. for a duration of 24-36 hrs.

16. A drilling fluid containing the random copolymer according to claim 1, wherein with respect to 100 mL base mud, a dose of the random copolymer is 0.5-4 g.

* * * * *